United States Patent [19]

Fukuda et al.

[11] Patent Number: 4,698,251

[45] Date of Patent: Oct. 6, 1987

[54] MAGNETIC RECORDING MEDIUM AND METHOD OF PRODUCING THE SAME

[75] Inventors: Yasutaka Fukuda, Sagamihara; Shigeo Shimizu; Atsushi Nakano, both of Yokohama, all of Japan

[73] Assignee: Victor Company of Japan, Limited, Yokohama, Japan

[21] Appl. No.: 820,494

[22] Filed: Jan. 17, 1986

[30] Foreign Application Priority Data

Jan. 22, 1985 [JP] Japan .................................. 60-8321
Mar. 6, 1985 [JP] Japan .................................. 60-42832

[51] Int. Cl.[4] .......................... G11B 5/64; G11B 5/82
[52] U.S. Cl. ...................................... 428/64; 360/135; 427/129; 427/131; 427/132; 427/250; 427/292; 428/156; 428/694; 428/900
[58] Field of Search ................. 428/694, 900, 64, 156; 427/129, 131, 292, 250, 132; 360/135

[56] References Cited

U.S. PATENT DOCUMENTS

| | | | |
|---|---|---|---|
| 4,046,932 | 9/1977 | Hartmann et al. | 427/129 |
| 4,307,156 | 12/1981 | Yanagisawa et al. | 427/131 |
| 4,380,558 | 4/1983 | Yanagisawa et al. | 427/129 |
| 4,430,387 | 2/1984 | Nagakawa et al. | 428/65 |
| 4,608,293 | 8/1986 | Wada et al. | 427/129 |

*Primary Examiner*—Paul J. Thibodeau
*Attorney, Agent, or Firm*—Jordan and Hamburg

[57] ABSTRACT

A magnetic disk or like magnetic recording medium having a magnetic layer provided on a non-magnetic substrate by dry-process or wet-process plating means and allowing a head to write and read data thereinto and thereoutof, and a method or producing such a recording medium. Scratch marks are formed on the surface of a non-magnetic thin layer, which is provided on the substrate, at a predetermined pitch and a predetermined depth in a particular direction which is substantially aligned with a direction in which the head writes data. A magnetic layer is deposited on the scratched surface of the non-magnetic layer. The pitch is less than about 50 microns, preferably about 0.1 to 10 microns, while the depth is about 0.002 to 0.1 microns in terms of center line mean roughness.

11 Claims, 16 Drawing Figures

MAGNETIC RECORDING MEDIUM AND METHOD OF PRODUCING THE SAME

BACKGROUND OF THE INVENTION

The present invention relates to a magnetic disk or like magnetic recording medium of the kind having a magnetic layer, or film, which is provided on a non-magnetic substrate by dry-process or wet-process plating means, and a method of producing such a recording medium.

Magnetic disks which are applicable to computer peripherals for data storage purposes may generally be classified into two types, i.e., a coated type having a magnetic layer provided on a non-magnetic substrate by a coating and a plated type having a magnetic layer deposited by a dry-process or wet-process plating means. A plated type magnetic disk features an inherently high magnetic material packing density and, therefore, is feasible for high-density recording because a magnetic layer thereof is formed not by using a binder but by depositing Co-based magnetic alloy or like composition on a non-magnetic substrate by plating means. However, the problem with such a plated type magnetic disk left unsolved is that since the easy axis within the magnetic layer provided by plating is isotropic or since it is oriented in the radial direction of the disk, playback output, resolution and other factors attainable with the disk are limited.

The question which led us to the present invention was whether a magnetic layer formed on a plated type magnetic disk by plating means was influenced in one way or another by the surface condition of an under layer during the course of formation. After research and a series of experiments, we found that the orientation of the easy axis of a plated magnetic layer is effected by the surface condition of an under coating. Specifically, to produce magnetic disks, we prepared non-magnetic substrates which were each scratched substantially concentrically or substantially helically, i.e., substantially along a direction in which a playback head reads signals. When magnetic layers, or films, were provided by plating on the so roughened surfaces of the non-magnetic substrates, they showed magnetic anisotropy having an easy axis which extends in the reading direction of a playback head, due to the influence of their underlying surface configurations.

The present invention is an achievement derived from the above-described finding.

SUMMARY OF THE INVENTION

It is an object of the present invention to provide a magnetic recording medium provided with a magnetic layer on a non-magnetic substrate by a dry-process or wet-process plating means for performing high-density recording, and a method of producing the same.

It is another object of the present invention to provide a magnetic disk provided with a magnetic layer on a non-magnetic substrate by a dry-process or wet-process plating means for performing high-density recording, and a method of producing the same.

It is another object of the present invention to provide a magnetic disk provided with a magnetic layer on a non-magnetic substrate by a dry-process or wet-process plating means to achieve high-density recording which enhances playback output, allows a minimum of output fluctuation to occur, increases resolution, and cuts down DC erasing noise, and a method of producing the same.

It is another object of the present invention to provide a generally improved magnetic recording medium and a method of producing the same.

In one aspect of the present invention, there is provided a magnetic recording medium into and out of which data are recorded and reproduced by a head, comprising a non-magnetic substrate, a non-magnetic thin layer provided on the substrate such that a lower surface of the non-magnetic layer makes contact with an upper surface of the substrate, an upper surface of the non-magnetic layer being formed with scratch marks at predetermined pitches and to a predetermined depth to extend in a particular direction which is substantially aligned with the direction in which the head records data, and a magnetic layer provided on the scratched upper surface of the non-magnetic layer.

In another aspect of the present invention, there is provided a method of producing a magnetic recording medium into and out of which data are recorded and reproduced by a head, comprising the steps of (a) preparing a non-magnetic substrate provided with a non-magnetic thin layer beforehand by plating, (b) providing scratch marks on a surface of the non-magnetic thin layer of the non-magnetic substrate by polishing means, the scratch marks extending in a particular direction which is substantially aligned with the direction in which the head records data, (c) providing a second non-magnetic thin layer on the scratched non-magnetic thin layer under a predetermined sputtering condition, and (d) providing a magnetic layer on the second non-magnetic thin layer.

In another aspect of the present invention, there is provided a method of producing a magnetic recording medium into and out of which data are recorded and reproduced by a head, comprising the steps of (a) preparing a non-magnetic substrate, (b) providing a non-magnetic thin layer on an upper surface of the substrate by electroless plating means, (c) providing on an upper surface of the non-magnetic thin layer scratch marks which extend substantially in a direction in which the head records data by means of polishing means, and (d) providing a magnetic layer on an upper surface of the scratched non-magnetic thin layer by wet-process plating means.

The above and other objects, features and advantages of the present invention will become more apparent from the following detailed description taken with the accompanying drawings.

DESCRIPTION OF THE PREFERRED EMBODIMENTS

While the magnetic recording medium and method of producing the same of the present invention is susceptible of numerous physical embodiments, depending upon the environment and requirements of use, substantial numbers of the herein shown and described embodiments have been made, tested and used, and all have performed in an eminently satisfactory manner.

As previously outlined, the principle of the present invention resides in providing a non-magnetic substrate of, for example, a magnetic disk, in a substantially concentric or a substantially helical configuration along the data reading direction of a playback head. The so treated or roughened surface of the non-magnetic substrate is plated to form a magnetic layer thereon. The magnetic layer, under the influence of the underlying surface, attains magnetic anisotropy having an easy axis which extends substantially in the data reading direction of a playback head.

The scratch marks provided on the non-magnetic substrate are dimensioned very small. Concerning the depth, for example, the scratch marks are about 0.002 to 0.1 microns deep in terms of center line mean roughness. The distance, or pitch, between the nearby scratch marks in the radial direction of the disk is preferably less than about 50 microns, more preferably about 0.1 to 10 microns. Should the center line mean roughness be far smaller than 0.002 microns, the orientation effect would be insignificant; should it be far greater than 0.1 microns, stable flying of a playback head would fail resulting in head crush and other occurrences. Meanwhile, pitches of the scratch marks greater than 50 microns also limit the attainable orientation effect. Such scratch marks in accordance with the present invention are readily implemented by, for example, placing an abrasive such as polishing particles on the surface of a non-magnetic substrate and, then, rotating the substrate. A magnetic layer is formed on the so scratched surface of the substrate by means of magnetic particles to complete a magnetic disk, which is representative of a magnetic recording medium of the present invention.

Preferred embodiments of a magnetic disk, or magnetic recording medium, and a method of producing it in accordance with the present invention will hereinafter be described in detail with reference made to the accompanying drawings.

Firstly, a dry-process plating type embodiment in which a magnetic layer is provided on a non-magnetic substrate by dry-process plating will be described.

Figure 1A:
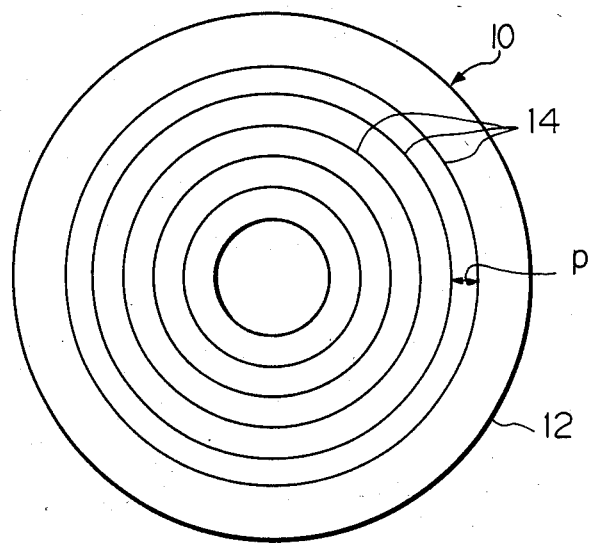
FIG. 1A is a plan view of a magnetic recording medium in the form of a disk embodying the present invention which is provided with scratches.
Figure 1B:
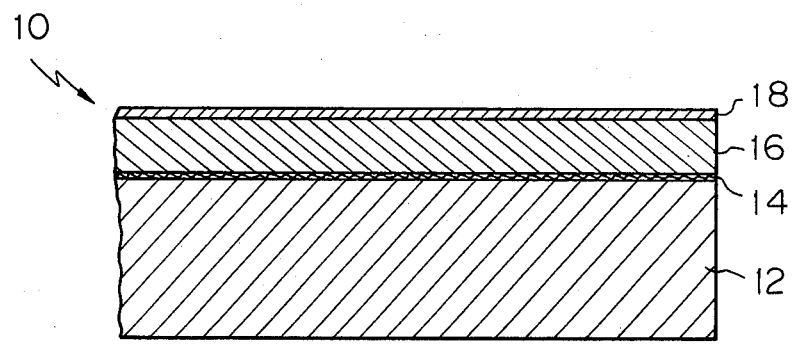
FIG. 1B is a sectional side elevation of the magnetic disk shown in FIG. 1A.

Referring to FIG. 1A, a magnetic disk 10 provided with scratch marks on an upper surface thereof is shown in a plan view. The scratched disk 10 is shown in a sectional side elevation in FIG. 1B. As shown, the magnetic disk 10 comprises an Al (aluminum) substrate 12 and having scratch marks 14 which extend substantially along the circumference of the disk 10, i.e., along the direction of data reading by a playback head, a Cr (chromium) layer 16 deposited on the substrate 12 from above the scratch marks 14, , and a Co (cobalt)-Ni (nickel) layer 18 which is provided on the Cr layer 16. The Al substrates 12 serves as a non-magnetic substrate, and the Co-Ni layer 18 as a magnetic layer. The substrate 12 is about 1.9 millimeters thick and plated with Ni-P (phosphor) beforehand. In this particular embodiment, the pitch p of the scratch marks 14 is about 1 microns.

Figure 2A:
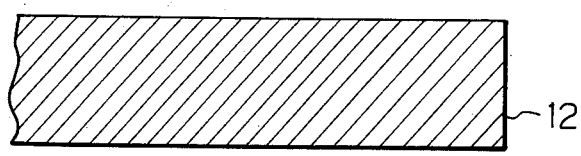
FIGS. 2A–2D are sections showing a series of steps for producing the magnetic disk of FIGS. 1A and 1B.
Figure 2B:
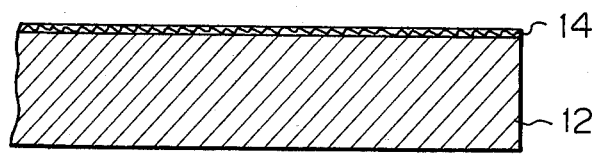

Referring to FIGS. 2A-2D, a procedure for producing the magnetic disk 10 in accordance with this particular embodiment is shown. As shown in FIG. 2A, the procedure starts with preparing the substantially 1.9 millimeters thick Al substrate, or blank, 12 with a Ni-P plated layer. Then, as shown in FIG. 2B, the previously stated polishing means is used to form scratch marks 14 on the upper surface of the substrate 12 such that the scratch marks 14 extend substantially along the circumference of the substrate 12, i.e. along the data reading direction of a playback head.

Figure 3A:
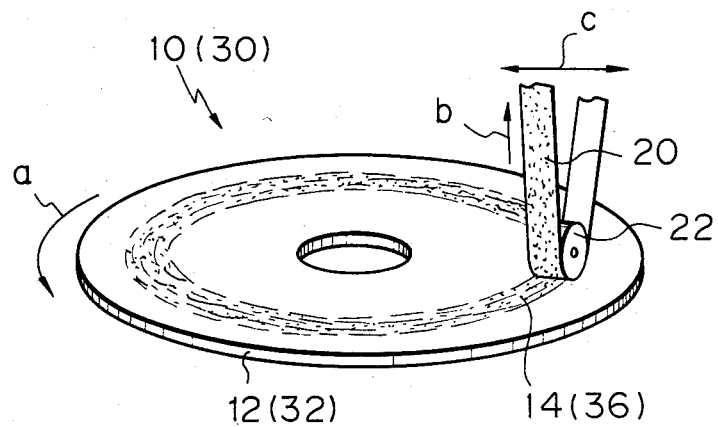
FIGS. 3A and 3B are perspective views each showing a specific technique which is usable to scratch a magnetic recording medium in accordance with the present invention.
Figure 3B:
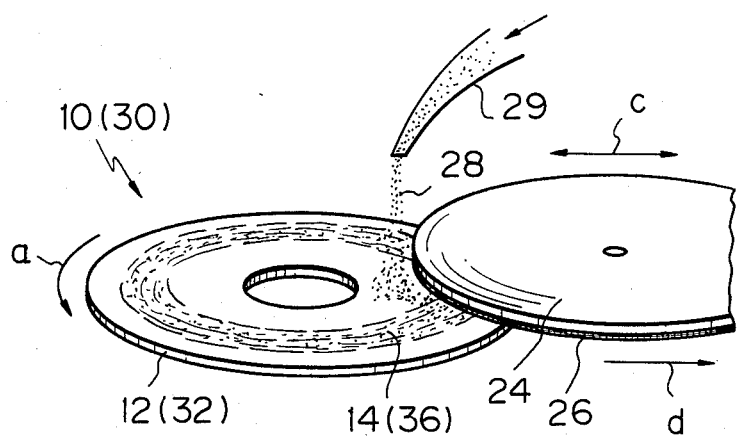

The polishing means may comprise a polishing tape as shown in FIG. 3A, free polishing particles and a polishing cloth as shown in FIG. 3B, etc. Specifically, in FIG. 3A, a polishing tape 20 which is movable as indicated by an arrow b driven by a roller 22 is positioned in contact with the upper surface of the substrate 12 by the weight of the roller 22, the substrate 12 being rotatable as indicated by an arrow a. Then, the tape 20 and roller 22 are bodily fed from the peripheral edge toward the center of the substrate 12 or in the opposite direction as indicated by a double-headed arrow c, thereby forming scratch marks 14 on the substrate 12. Here, the depth, pitch P and other characteristics of the scratch marks 14 are variable as desired by controlling the weight of the roller 22, the particle size of polishing particles provided on the tape 20, the radial feed speed of the tape 20 and roller 22, etc. In FIG. 3B, on the other hand, a rotary disk 24 whose underside is covered with a polishing cross is used in place of the tape 20 and roller 22 of FIG. 3A. The disk 24 rotates as indicated by an arrow d and makes contact, due to gravity, with free polishing particles 28 which are supplied from above through a pipe 29 onto the upper surface of the substrate 12, which rotates as indicated by an arrow a. In this condition, the disk 24 is fed radially on the substrate 12 from the peripheral edge toward the center of the latter or in the opposite direction as indicated by an arrow c, so that scratch marks 14 are formed on the substrate 12. Again, the depth, pitch P and other factors of the scratch marks 14 are variable as desired by changing the total weight of the disk 24 and polishing cloth 26, the particle size of the polishing particles 28, the radial feed speed of the disk 24, the amount of supply of the particles 28, etc.

Figure 2C:
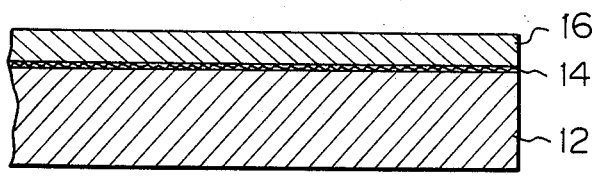
Figure 2D:
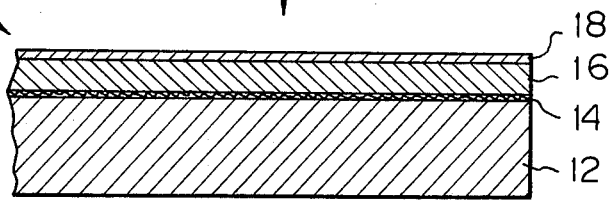

The Al substrate 12 with the scratch marks 14 is placed in a known sputtering device so as to form the non-magnetic Cr layer 16 to a thicknss of about 4000 angstroms under a predetermined sputtering condition, as shown in FIG. 2C. Thereafter, the magnetic Co-Ni layer 18 is deposited on the top of the Cr layer 16 to a thickness of about 600 angstroms, as shown in FIG. 2D. This completes the procedure for producing the magnetic disk 10.

In this particular embodiment, let the surface roughness of the upper surface of the Al substrate 12, i.e., the center line mean roughness Ra represent the depth of the scratch marks 14, and suppose that the sputtering condition associated with the Cr layer 16 is $2 \times 10^{-3}$ Torr in terms of Ar (argon) gas pressure. Under this condition, experiments were conducted using magnetic disks 10 with Ra which ranged from about 0.0029 microns to about 0.043 microns to measure their playback outputs (OUT), resolutions (RESOL), half-widths of isolated reproduced waveforms ($W_{50}$), C/N ratios (C/N), frequencies associated with halved outputs ($D_{50}$), coercivity (Hc), and noise (NS) (peak values substantially at the frequency of 1.5 megahertz which resulted from 5 megahertz recorded signals). The results of measurements are shown below in Table 1.

TABLE 1

| | Ra (μm) | OUT (mV) | RE- SOL (%) | $W_{58}$ (μm) | C/N (dB) | $D_{50}$ (KBPI) | He (Oe) | NS (dB) |
|---|---|---|---|---|---|---|---|---|
| Example 1 | 0.0029 | 184 | 85.2 | 2.23 | 50 | 13.5 | 606 | 11.24 |
| Example 2 | 0.0059 | 195 | 86.7 | 2.08 | 52 | 14.6 | 715 | 11.01 |
| Example 3 | 0.0135 | 198 | 87.9 | 2.04 | 52 | 15.2 | 806 | 11.70 |
| Example 4 | 0.0435 | 203 | 88.7 | 2.04 | 52 | 15.4 | 813 | 11.47 |

Meanwhile, magnetic disks 10 which were provided with Cr layers under $5 \times 10^{-3}$ Torr in terms of Ar gas pressure were measured to have playback outputs, resolutions, $W_{50}$, C/N ratios, $D_{50}$, Hc and noise as shown below in Table 2, with respect to Ra which ranged from about 0.0036 microns to about 0.0419 microns.

TABLE 2

| | Ra (μm) | OUT (mV) | RE- SOL (%) | $W_{58}$ (μm) | C/N (dB) | $D_{50}$ (KBPI) | He (Oe) | NS (dB) |
|---|---|---|---|---|---|---|---|---|
| Example 1 | 0.0036 | 170 | 88.2 | 2.17 | 52 | 13.9 | 800 | 11.45 |
| Example 2 | 0.0072 | 175 | 88.8 | 2.08 | 52 | 14.9 | 865 | 14.45 |
| Example 3 | 0.0120 | 183 | 90.7 | 1.98 | 52 | 15.2 | 890 | 14.68 |
| Example 4 | 0.0419 | 180 | 86.1 | 2.27 | 52 | 13.5 | 675 | 14.45 |

Comparing Tables 1 and 2, it will be seen that the magnetic disks 10 each having a magnetic layer 18 provided on the Al substrate 12 which has scratch marks 14 along the circumference thereof, i.e., along the data reading direction of a playback head are unprecedentedly high in Hc, playback output and resolution and desirable in $W_{50}$, C/N ratio and noise as well. That is, a disk with a dry-process magnetic layer deposited on a surface of a substrate which is scratched along the data reading direction of a playback head as in the embodiment enhances playback output. Since the extension of the scratch marks is substantially parallel to the data reading direction a playback head, the scratch marks sparingly contribute to the generation of a leakage magnetic field and, therefore, the increase in the DC erasing noise. In addition, the output fluctuation is negligible because the scratch marks are substantially constant in dimensions and, therefore, in orientation.

Next, an embodiment of magnetic disks which are implemented with wet-process plating means will be described.

Figure 4A:
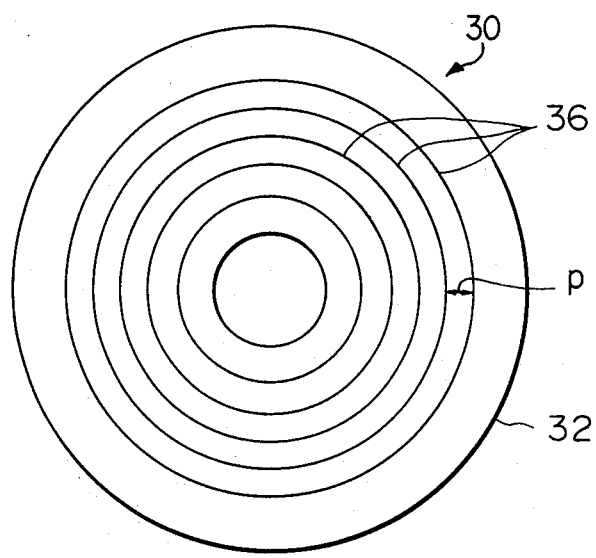
FIG. 4A is a plan view of a magnetic recording medium in the form of a disk in accordance with another embodiment of the present invention.
Figure 4B:
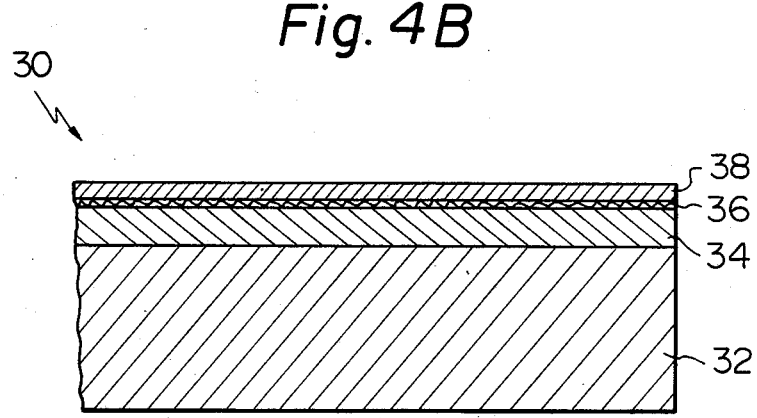
FIG. 4B is a sectional side elevation of the magnetic disk shown in FIG. 4A.

Referring to FIG. 4A, a non-magnetic substrate having an upper surface with scratch marks is shown in a plan view. The substrate of FIG. 4A is shown in a sectional side elevation in FIG. 4B. A magnetic disk 30 in this particular embodiment is made up of an about 1.9 millimeters thick Al substrate 32, an Ni-P non-magnetic thin layer 34 deposited on the upper surface of the substrate 32 to a thickness of 10–20 microns by, for example, electroless plating means, and an about 600 angstroms thick Co-P magnetic layer 38 deposited on the top of the Ni-P layer 34. The Ni-P layer 34 is provided with scratch marks 36 on its upper surface which extend substantially along the circumference of the disk 30, i.e. along the data reading direction of a playback head. Again, the Al substrate 32 serves as a non-magnetic substrate. In the illustrative embodiment, the depth of the scratch marks 36 is about 0.007 microns to about 0.04 microns in terms of center line mean roughness Ra, while the pitch p of the scratch marks 36 is about 1 micron.

Figure 5A:
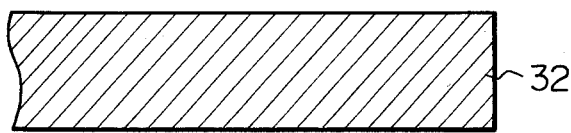
FIGS. 5A-5D are sections showing a series of steps for producing the magnetic disk of FIGS. 4A and 4B.
Figure 5B:
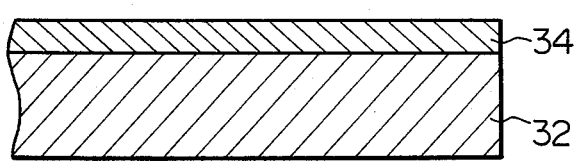
Figure 5C:
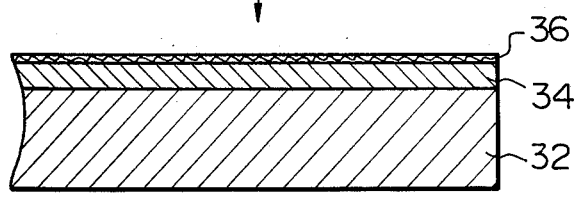
Figure 5D:
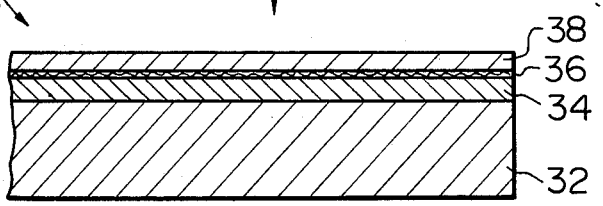

Referring to FIGS. 5A–5D, a sequence of steps for producing the magnetic disk 30 is shown. As shown in FIG. 5A, the Al substrate 32 which is about 1.9 millimeters thick is prepared as a non-magnetic substrate. Then, as shown in FIG. 5B, the Ni-P thin layer 34 is formed on the upper surface of the substrate 32 to a thickness of about 10–20 microns using, for example, electroless plating means. This is followed by, as shown in FIG. 5C, scratching the upper surface of the Ni-P layer 34 such that the scratch marks 36 extend substantially along the circumference of the substrate 32, i.e. along the data reading direction of a playback head. For the scratching step, use may be made of the polishing means such as shown in FIGS. 3A or 3B. Finally, as shown in FIG. 5D, the Co-P magnetic layer 38 is provided on the top of the scratched Ni-P layer 34 by means of known wet-process plating means, not shown. The wet-process plating means is effected under the following bath conditions:

| | | |
|---|---|---|
| $CoSO_4.7H_2O$ | 0.05 mol/l | |
| $NaH_2PO_2.H_2O$ | 0.15 mol/l | |
| $(NH_4)_2SO_4$ | 0.50 mol/l | PH 8.0 |
| $Na_2C_4H_4O_6.H_2O$ | 0.50 mol/l | 70° C. |

Two different kinds of magnetic disks were produced by a different method and different conditions from those of the disk 30 of the illustrative embodiment. Specifically, a comparative magnetic disk A comprised a scratch-free, Ni-P non-magnetic thin layer which was mirror-finished (random in polishing direction) and about 0.003 microns in center line mean roughness Ra, and a Co-P magnetic layer provided on the Ni-P layer using, as in the illustrative embodiment, wet-process plating means. A comparative magnetic disk B, on the other hand, comprised an Ni-P non-magnetic thin layer which was scratched not substantially along the circumference but isotropically, or randomly (Ra: about 0.007 to 0.02 microns), and a Co-P magnetic layer provided on the Ni-P layer using, as in the illustrative embodiment, wet-process plating means.

Figure 6:
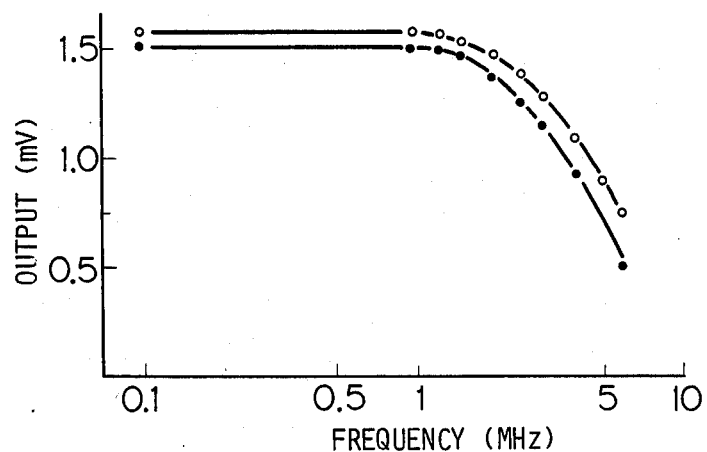
FIGS. 6 and 7 are plots showing characteristics particular to the magnetic disk of FIGS. 4A and 4B.

The magnetic disk A was compared with the magnetic disk 30 of the illustrative embodiment (Ra assumed to be about 0.015 microns) with respect to the frequency characteristic of reproduced outputs, using an Mn-Zn ferrite magnetic head having a gap length of 1.2 microns and a track width of 50 microns. The results are plotted in FIG. 6 in which circles are representative of data associated with the illustrative embodiment and dots data associated with the disk A. The plot shows that the disk 30 of this particular embodiment is higher in playback output than the disk A. Stated another way, it proves that a disk having a magnetic layer provided on a surface which is scratched in the data reading direction of a playback head allows unprecedentedly high outputs to be reproduced.

Figure 7:
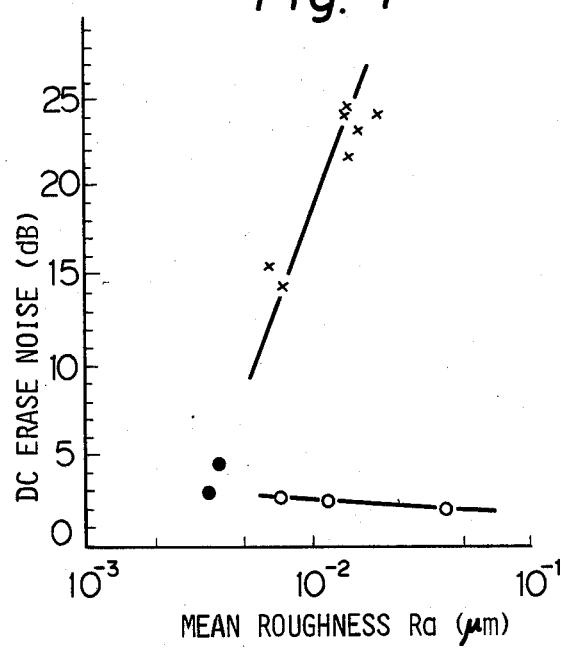

The disk 30 of the embodiment of the present invention and the disks A and B produced for comparison purposes were further compared with respect to DC erasing noise, as shown in FIG. 7. In FIG. 7, circles are associated with the embodiment of the present invention, dots with the disk A, and crosses with the disk B. It will be seen that the disk 30 of the embodiment of the present invention does not invite any increase in DC erasing noise despite the scratch marks, presumably because the scratch marks extend in the data reading direction of a playback head. In contrast, the DC erasing noise is noticeably increased in the disk B due to scratching.

The disk 30 of the illustrative embodiment whose Ra was about 0.015 microns, for example, was tested under the application of a maximum magnetic field of 10 kOe and using VSM to determine its magnetostatic characteristics. When the magnetic field was applied in the circumferential direction, Hc was measured to be 700 oersteds, Rs 0.80, and S* 0.90; when it was applied in the radial direction, Hc was measured to be 650 oersteds, Rs 0.65, and S* 0.80. This shows that the easy axis extends in the circumferential direction of the disk.

In addition, the disk 30 in accordance with the illustrative embodiment has substantially constant orientation due to the substantially constant dimensions of the scratch marks, thereby entailing a minimum of output fluctuation.

In summary, it will be seen that any of the embodiments of the present invention shown and described realizes high-density recording which enhances playback output and cuts down DC erasing noise.

Various modifications will become possible for those skilled in the art after receiving the teachings of the present disclosure without departing from the scope thereof.

What is claimed is:

1. A magnetic disk recording medium into and out of which data are recorded and reproduced by a head, comprising:
   a non-magnetic substrate;
   a non-magnetic thin layer provided on said substrate such that a lower surface of said non-magnetic thin layer contacts an upper surface of said substrate, an upper surface of said non-magnetic thin layer being processed to have scratch marks oriented generally in a circumferential direction of the magnetic disk recording medium, the depth of the scratch marks being in a range from 0.002 to 0.1 microns and the pitch between adjacent scratch marks in a radial direction ranging from 0.1 to 50 microns; and
   a magnetic layer provided on the scratch marked upper surface of the non-magnetic thin layer.

2. A magnetic disk recording medium as claimed in claim 1, wherein said pitch is about 0.1 to 10 microns.

3. A magnetic disk recording medium as claimed in claim 1, further comprising a second non-magnetic thin layer provided between the first said non-magnetic thin layer and the magnetic layer.

4. A magnetic disk recording medium as claimed in claim 3, wherein the second non-magnetic thin layer comprises an about 4000 angstroms thick Cr thin layer.

5. A method of producing a magnetic disk recording medium into and out of which data are recorded and reproduced by a head, comprising the steps of:
   (a) preparing a non-magnetic substrate and plating a non-magnetic thin layer onto the substrate;
   (b) providing scratch marks on a surface of said non-magnetic thin layer by polishing means such that the scratch marks extend generally in a circumferential direction with the pitch between adjacent scratch marks in a radial direction being in a range from 0.1 to 50 microns and the depth of the scratch marks being in a range from 0.002 to 0.1 microns;
   (c) providing a second non-magnetic thin layer on the scratched non-magnetic thin layer utilizing sputtering; and
   (d) providing a magnetic layer on said second non-magnetic thin layer.

6. A method as claimed in claim 5, wherein the scratches are formed to a depth of about 0.002 to 0.1 microns in terms of center line mean roughness.

7. A method as claimed in claim 5, wherein said pitch is about 0.1 to 10 microns.

8. A method as claimed in claim 5, wherein said plating of said non-magnetic thin layer onto the non-magnetic substrate is effected utilizing electroless plating.

9. A method as claimed in claim 5, wherein said polishing comprises supplying polishing particles to the upper surface of the non-magnetic thin layer, pressing the supplied polishing particles onto the upper surface of the non-magnetic thin layer using pressing means, and moving the pressing means relative to said upper surface of the non-magnetic thin layer.

10. A method as claimed in claim 9 comprising supplying the polishing particles to a polishing tape, said pressing step comprising utilizing a pressing roller for pressing said polishing tape against said upper surface of the non-magnetic thin layer.

11. A method as claimed in claim 10 further comprising feeding the tape and the pressing roller in a generally radial direction.

* * * * *